United States Patent [19]

Yang et al.

[11] Patent Number: 4,889,058
[45] Date of Patent: Dec. 26, 1989

[54] HEAT RECOVERY BOILER

[75] Inventors: Wen-Ching Yang, Murrysville; Suh Y. Lee, Monroeville; Bozorg Ettehadieh, Wilkins Township, Allegheny County, all of Pa.

[73] Assignee: Westinghouse Electric Corp., Pittsburgh, Pa.

[21] Appl. No.: 313,569

[22] Filed: Feb. 22, 1989

[51] Int. Cl.⁴ .......................... F23B 5/00; F23G 7/06
[52] U.S. Cl. .................................. 110/214; 110/234; 110/246
[58] Field of Search ........................ 110/246, 214, 234

[56] References Cited

U.S. PATENT DOCUMENTS 4,475,472 10/1984 Adrian et al. ...................... 110/214
4,699,070 10/1987 O'Connor .

Primary Examiner—Carroll B. Dority
Attorney, Agent, or Firm—Fred J. Baehr, Jr.

[57] ABSTRACT

An improved waste heat boiler having a front, back and two side walls that cooperate to form a flue with a rotary combustor for burning municipal solid waste extending through the front wall and an asymmetrical bull nose protuberance disposed on the back wall above the rotary combustor and a plurality of nozzles disposed in the side walls or the front wall aligned with the tip of the protuberance to direct jets of air inwardly and downwardly into the flue to reduce the CO content of the exhaust gases from the waste heat boiler.

14 Claims, 2 Drawing Sheets

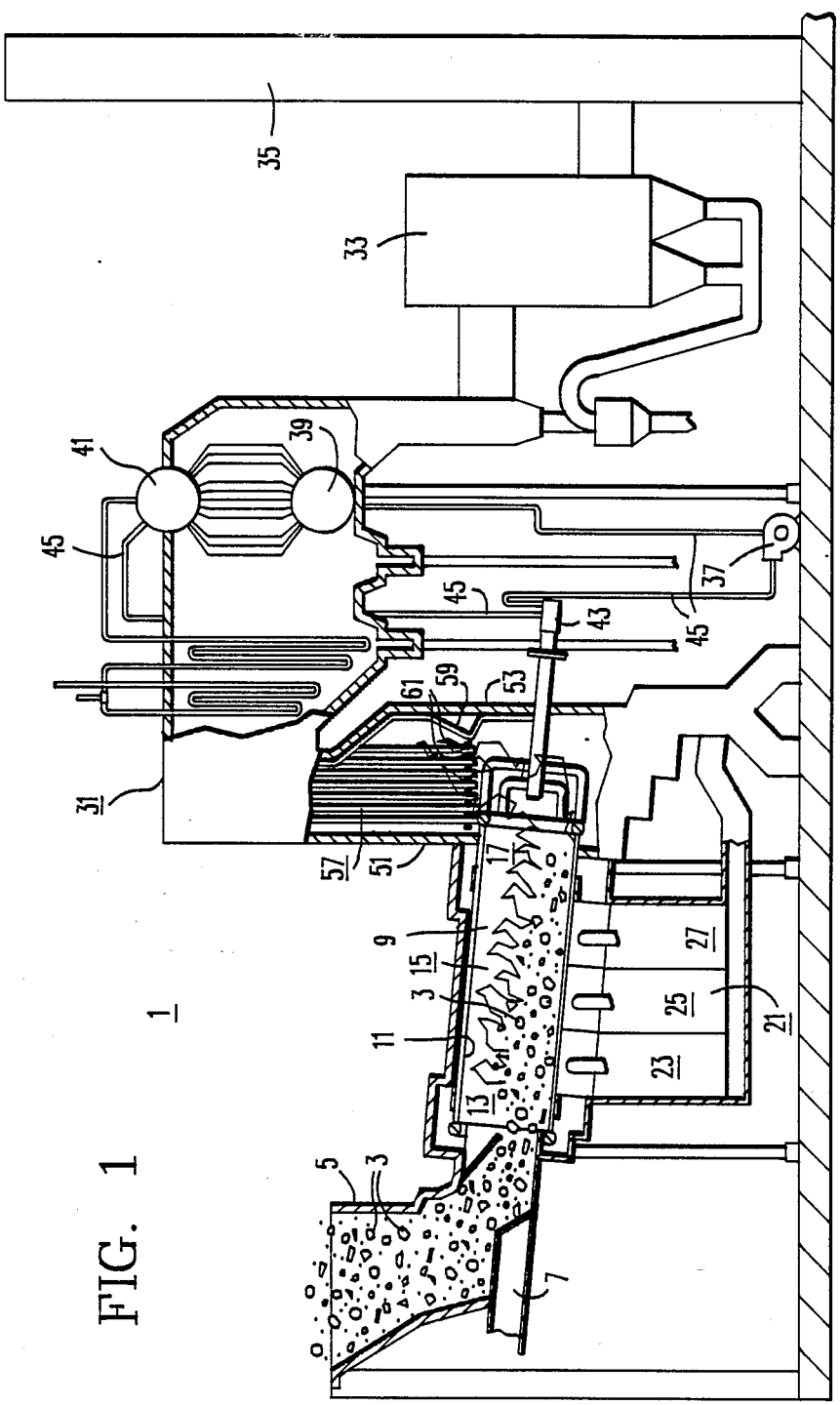

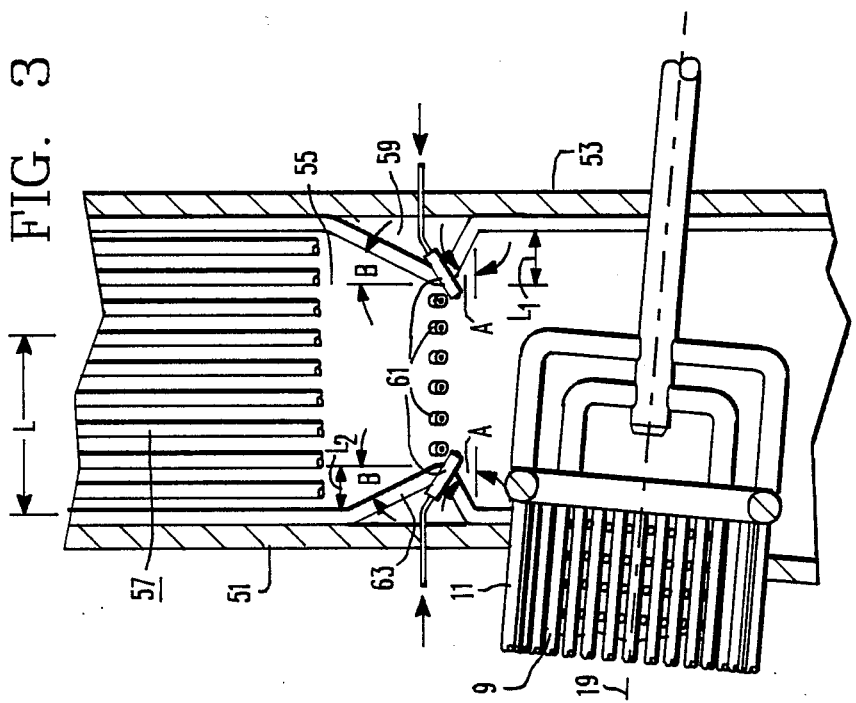
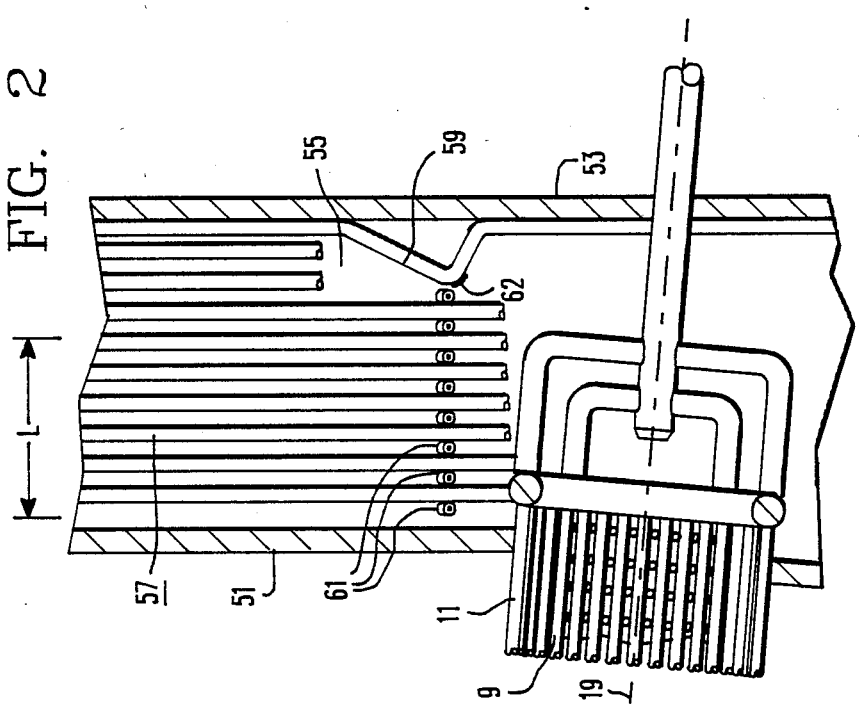

HEAT RECOVERY BOILER

BACKGROUND OF THE INVENTION

The invention relates to a heat recovery boiler and more particularly to an improved heat recovery boiler utilized with a rotary combustor for burning municipal solid waste.

Performance data obtained at various municipal waste incinerators indicated pockets of high concentrations of CO in the heat recovery boilers down stream of the combustors. Periodical or sporadic high concentration of CO in the heat recovery boiler may be due to heterogeneous variations in the municipal solid waste feed, whereas constant pockets of high concentrations of CO in the heat recovery boiler can be attributed to poor mixing and localized deficiency of oxygen. High concentrations of CO have been found in regions above ash burn out steps, where residual carbon in the ash smolders. Another region of high concentrations of CO has been found to be immediately above the extended barrel of the rotary combustor where it protrudes into the heat recovery boiler. If not eliminated these pockets of high concentration of CO may result in higher than desired concentration of CO in the exhaust stack.

The O'Connor patent number 4,699,070 shows a protuberance on the back wall with air nozzles disposed below the necked down portion of the flue and not in the portion of the flue where the velocity and turbulence are the highest. The protuberance is symmetrical and the angular disposition of the upper portion thereof is such that ash would collect thereon.

SUMMARY OF THE INVENTION

Among the objects of the invention may be noted the provision of means disposed in a waste heat boiler to reduce the concentration of CO in the exhaust gases prior to entering the stack.

In general, a waste heat boiler, when made in accordance with this invention, has a front wall, a back wall and two side walls cooperating to form a flue and a rotary combustor for burning municipal solid waste extending through the front wall and discharging exhaust gases into the flue. The waste heat boiler also has a protuberance disposed on the back wall above the rotary combustor. The protuberance is nose-shaped and extends across the width of the back wall and into the flue about one third of the way across to form a necked down portion within the flue. A plurality of nozzles are disposed in the side walls in the necked down portion of the flue for directing jets of air inwardly and downwardly into the exhaust gases flowing upwardly through the flue to reduce the CO concentration in the exhaust gases.

BRIEF DESCRIPTION OF THE DRAWINGS

The invention as set forth in the claims will become more apparent by reading the following detailed description in conjunction with the accompanying drawings, wherein like reference numerals refer to like parts through the drawings and in which:

FIG. 1 is a schematic drawing of an incinerator with a rotary combustor for burning municipal solid waste supplying heat to a waste heat boiler made in accordance with this invention;

FIG. 2 is an enlarged partial sectional view of a portion of the flue of the waste heat boiler; and FIG. 3 is an enlarged partial sectional view of a portion of the flue of the waste heat boiler showing an alternative embodiment.

DESCRIPTION OF THE PREFERRED EMBODIMENT

Referring now to the drawings in detail and in particular to FIG. 1 there is shown an incinerator 1 for burning municipal solid waste 3, which is fed through a hopper 5 to a ram 7. The ram 7 pushes discrete amounts of the waste 3 into a rotary combustor or combustion barrel 9, wherein the waste 3 is burned. The combustion barrel 9 is formed from a plurality of generally parallel cooling pipes 11 with a plurality of porous plates or webs, not shown, interposed between adjacent cooling pipes 11 disposed in a circular array to form a generally cylindrical barrel 9. The cylindrical combustion barrel 9 is divided into an inlet or drying portion 13 adjacent the hopper 5, an intermediate or combustion portion 15 and an outlet or burn out portion 17. The combustion barrel 9 is disposed for rotation on an inclined axis 19 forming an angle with a horizontal line so that an inlet end 13 thereof is disposed above an outlet end 17 thereof. A wind box 21 is disposed to supply combustion air to the combustion barrel 9. The wind box 21 is divided into an inlet portion 23 from which the air is supplied through the porous webs to an inlet or drying portion 13 of the combustor barrel 9 to dry the waste 3, an intermediate portion 25 from which combustion air is supplied through the porous webs to the combustion portion 15 of the combustor barrel 9 to devolatilize and burn the waste 3 and an outlet portion 27 from which combustion air is supplied through the porous webs to the burn-out portion 17 of the combustion barrel 9 to burn the remaining combustible solids, CO and any other remaining combustible gases. Each portion of the wind box 21 is further divided into underfire and overfire portions, each portion having separate controls so that the underfire air and overfire air can be separately controlled in each portion of the combustion barrel 9.

Exhaust gases from the rotary combustor barrel 9 flow through a waste heat boiler 31, a filter 33 such as an electrostatic precipitator or other filtering means and a stack 35.

The cooling pipes 11 making up the rotary combustion barrel 9 are supplied with cooling fluid from a pump 37 which takes its suction from a water drum 39 in the waste heat boiler 31 and returns the heated cooling fluid to a steam drum 41 via a rotary joint 43 and associated piping 45.

As shown best in FIG. 2, the waste heat boiler 31 comprises a front wall 51, a back wall 53 and a pair of side walls 55, which cooperate to form a flue 57. The walls are normally made up of a plurality of closely packed water wall tubes 58. The rotary combustor 9 extends through the front wall 51 and discharges ash and exhaust gases into the flue 57. The exhaust gases may under certain firing conditions contain an undesirable quantity or concentration of CO, so in order to reduce the concentration of CO, an asymmetrical bull nose proturberance 59 is disposed to extend across the width of the back wall 53 above the rotary combustor 9 to form a necked down portion having a throat adjacent the tip of the bull nose protuberance 59. The distance that the protuberance is disposed above the rotary combustor 9 is generally one combustor diameter or more above the central axis 19 of the rotary combustor 9, measured from where the axis 19 of the rotary combustor 9 intersects the flue 57.

Disposed in the side walls 55 are a plurality of nozzles 61 for supplying jets of combustion air to the flue 57. The nozzles 61 are disposed at the elevation of the tip of the bull nose 59 and direct the combustion air inwardly and downwardly generally at an angle of 15° to 30° to supply combustion air, which cooperates with the restriction formed by the bull nose protuberance 59 to mix the combustion air with the exhaust gases from the rotary combustor 9. By mixing the CO with oxygen, $O_2$, in the combustion air in a temperature zone of the waste heat boiler where the temperatures are in excess of 1400° F., the CO and $O_2$ readily react to form $CO_2$, reducing the concentration or amount of CO in the exhaust emitted from the stack 35 to acceptable levels, irrespective of the characteristic of the waste 3 being fed into the rotary combustor 9. While the nozzles 61 are shown disposed in the walls and bull nose protuberances, they could also be disposed in any combination of walls and or protuberances or in a single wall as in the front wall 51, which is preferred, when a single bull nose protuberance 59 is installed. Air is supplied to the nozzles 61 at a pressure, which cooperates with the nozzles 61 to produce jets of air having a velocity, which completely penetrate the exhaust gases at the narrow throat. Thus, when the nozzles 61 are disposed in the side walls 55 the jets of combustion air need only penetrate half the distance between the side walls, whereas when disposed in the front wall the jets of combustion air must penetrate the whole distance between the front wall 51 and the tip of the bull nose protuberance 59. Experiments have proven the criticality of the location of the nozzles 61.

The experiments were carried out by injecting tracer gas helium into the flow stream through a porous sintered-steel diffuser located at the simulated travelling grate at the bottom of the cold model to simulate generation of CO at the actual plant. Gas samples were then taken by traversing a gas sampling probe across two separate cross-sections. The gas samples were passed through a Gow-Mac thermoconductivity gas analyzer to determine He concentration at each location. Vertical gas velocity profiles were also obtained at two separate cross-sections by traversing a thermoanemometer. Altogether fourteen tests with different configurations were carried out:

Test 1—Swirl Without Jets—swirl piece in 12" pipe and no jet flow.

Test 2—Swirl with Jets—swirl piece in 12" pipe and jets are operational.

Test 3—No Swirl And No Jets—no swirl piece and no jet flow.

Test 4—No Swirl With Jets—no swirl piece but with jet flow.

Test 5—Asymmetric Bull Nose Configuration 1—big bull nose at the back wall.

Test 6—Asymmetric Bull Nose Configuration 2—big bull nose at the front wall.

Test 7—Symmetric Bull Noses—both bull noses are similar.

Test 8—Round Jets at Lower Location (No Swirl-)—repeat of Test 4 with jet plenum lowered by $6\frac{3}{8}''$.

Test 9—Rectangular Jets at Lower Location (No Swirl-)—repeat of Test 8 with round jets of $\frac{3}{8}''$ diameter replaced by rectangular jets of 0.0101" by 0.165". The jet dimensions were scaled based on the aspect ratio of 1.30" by 2.13" jets to be employed at York County and a hydraulic diameter of $\frac{3}{8}''$.

Test 10—Staggered Bull Noses—a new set of bull noses installed in staggered positions.

Test 11—A combination of both bull noses and jets was used for this test. The bull noses were the same ones employed during Test 5 with big bull nose on the back wall. The round jets were on side walls. The jet plenums were lowered to a boiler location similar to that employed earlier for Test 8. The bull noses were located with tips of the bull noses about $4\frac{1}{2}''$ higher than the plane of jets. The jet velocities were set at approximately 450 ft/sec in three of the four plenums and the remaining one at 250 ft/min.

Test 12—This test is a duplication of the last test, Test 11, with jets in all four plenums set at 450 ft/sec.

Test 13—The tips of the bull noses in this test were lowered such that they were at the same plane of the jets. The jets which were blocked by the bull noses, 11 out of a total of 21 on each side wall, were blinded and not used during the experiment. The jet velocities were set at approximately 950 ft/sec.

Test 14—Test 12 were repeated in this test with jet velocities set at about 450 ft/sec.

The elevation for traverse of the gas sampling probe was selected on the basis of predicted temperature profiles in the boiler. The selected elevation corresponds to a temperature level of approximately 1400° F. in the boiler. Negligible conversion of CO is expected for temperatures lower than 1400° F. Altogether, two levels of helium concentration profiles and gas velocity profiles were obtained.

In order to evaluate the relative effectiveness of different boiler configurations, a quantitative criterion was developed to compare their relative performance. The criterion can be simply expressed as $$F = \frac{E_i C_o - C_i \cdot V_i \cdot A_i}{E_i C_o \cdot V_i \cdot A_i} \qquad (1)$$

where
$C_o$ = tracer concentration at perfect mixing
$C_i$ = measured local tracer concentration at ith cell
$V_i$ = measured local vertical gas velocity at ith cell
$A_i$ = cross-sectional area of ith cell The tracer concentration at perfect mixing is calculated from the actual measurements of tracer gas concentration profiles and gas velocity profiles from the following equation:

$$C_o = \frac{E_i V_i \cdot V_i \cdot A_i}{E_i V_i \cdot A_i} \qquad (2)$$

The criterion shown in Equation (1) estimates the deviation from the state of perfect mixing at the cross-section where the tracer concentration profile was measured. By definition, F=0 for perfect mixing with F=1 for no mixing. In actual cases, F ranges between 0 and 1 and the larger the F the worse the mixing is.

This quantitative criterion was applied at all 14 tests carried out, and the results are tabulated below:

| Test No. | Boiler Configuration | F Value |
|---|---|---|
| 1 | Swirl Without Jets | .2475 |
| 2 | Swirl With Jets | .2581 |
| 3 | No Swirl & No Jets | .1490 |

-continued

| Test No. | Boiler Configuration | F Value |
| --- | --- | --- |
| 4 | No Swirl With Jets | .1097 |
| 5 | Large Bull Nose At Back Wall | .0715 |
| 6 | Large Bull Nose At Front Wall | .1145 |
| 7 | Symmetric Bull Noses | .1659 |
| 8 | Round Jets At Lower Location (No Swirl) | .1521 |
| 9 | Rectangular Jets At Lower Location (No Swirl) | .1261 |
| 10 | Staggered Bull Noses | .1673 |
| 11 | Bull Noses-Jets Combination No. 1 (Low Flow) | .1085 |
| 12 | Bull Noses-Jets Combination No. 1 (High Flow) | .0821 |
| 13 | Bull Noses-Jets Combination No. 2 (High Flow) | .0270 |
| 14 | Bull Noses-Jets Combination No. 2 (Low Flow) | .0339 |

On the basis of this analysis, when the plane of the jets is lower than the tips of the bull noses (Tests No. 11 and 12 with F=0.1085 and 0.0821, respectively), the bull noses-jets combination is only as effective as the case where only bull noses were present (Test No. 5 with F=0.0715). The addition of jets on side walls under this configuration serves no purpose and it may even be detrimental because of premature quenching of the flue gases. But when the tips of the bull noses were lowered to the plane of the jets as in Tests No. 13 and 14, (F=0.0270 and 0.0339, respectively), substantial improvement in gas mixing over that of Test No. 5 (bull nose alone) was observed. This is also true even when lower jet velocities (Test No. 14) were employed.

The distance between the front and back walls 51 and 53 is indicated as L and the distance that the bull nose protuberance 59 extends into the flue 57 is indicated as $L_1$. To provide the optimum mixing of the exhaust gases with the combustion air supplied by the nozzles 61 under the constraints of pressure drop through the flue 57 and heat transfer considerations, the ratio of $L/L_1$ is generally in the range of 2.5 to 3. The bull nose protuberance is preferably asymmetrical with the upper portion of the bull nose protuberance 59 forming an angle B generally in the range of 20° to 30° with a vertical line which is generally related to the angle of internal friction of the particulate ash material in the exhaust, i.e., 60° to 70°. The angle of internal friction varies due to the varying characteristics of the waste 3 and the particulate ash material it produces. The lower portion of the bull nose protuberance 59 forms an angle A generally in the range of 10° to 15° with a horizontal line. The upper and lower portions of the bull nose protuberance 59 are joined together by an arcuate portion forming a smooth juncture therebetween. The bull nose protuberance 59 is preferably formed of water wall tubes 58 which as noted earlier form the walls 51, 53 and 55 of the flue 57. The lower portion and tip of the bull nose protuberance may be coated with an erosion, corrosion resistant material 62 such as silicon carbide to protect it from deterioration caused by impingement of the flame and particulate ash material in the exhaust gases as it is positioned in a high velocity turbulent region of the flue 57.

In FIG. 3 is shown an alternative embodiment in which a second asymmetrical bull nose protuberance 63 is disposed on the front wall 51 opposite the bull nose protuberance 59 disposed on the back wall 53, but is generally the same shape. However, the distance the second bull nose protuberance 63 extends into the flue 57 is indicated by $L_2$. The ratio of $L_1/L_2$ is generally in the range of 2 so that the second bull nose protuberance 63 extends into the flue 57 about half as far as the bull nose protuberance 59. In this embodiment the nozzles 61 are disposed in the side walls 55 aligned with the tips of the protuberances in the narrowest portion of the flue 37.

The location of the asymmetrical bull nose protuberances 59 and the disposition of the nozzles 61 cooperate to advantageously provide the optimum turbulence and mixing of combustion air in a temperature zone where the combustion air thoroughly mixes with the exhaust so that the CO in the exhaust gases reacts with $O_2$ in the combustion air supplied through the nozzles 61 to form $CO_2$ and the upper portion of the asymmetrical bull nose protuberance is advantageously angled so as not to allow ash to collect thereon.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. A waste heat boiler having a front wall, a back wall and two side walls cooperating to form a flue and a rotary combustor for burning municipal solid waste, extending through said front wall and discharging exhaust gases into said flue, said waste heat boiler comprising a protuberance with an asymmetrical nose shaped cross section having an arcuate tip disposed on the back wall above the rotary combustor and extending across the width of the back wall and into the flue to form the narrowest necked down portion of the flue adjacent said tip; and a plurality of nozzles disposed at the elevation of said tip of said nose shaped protuberance to direct jets of air inwardly and downwardly into the exhaust gases flowing through the flue to reduce the CO concentration in the exhaust gases to acceptable levels.

2. The waste heat boiler of claim 1, wherein the asymmetrical nose shaped protuberance has an upper portion thereof forming an angle of 20°-30° with a vertical line and a lower portion thereof forming an angle of 10°-15° with a horizontal line, with the arcuate tip portion connecting the upper and lower portions.

3. The waste heat boiler of claim 1, wherein the distance between the front and back walls is L and the distance the protuberance extends into the flue is $L_1$ and the ratio of $L/L_1$ is generally 2.5 to 3.

4. The waste heat boiler of claim 1, wherein the nozzles are directed downwardly at an angle generally in the range of 15° to 30°.

5. The waste heat boiler of claim 1 and further comprising a protuberance disposed on the front wall above the rotary combustor and opposite the protuberance on the back wall forming a necked down portion in the flue.

6. The waste heat boiler of claim 5, wherein the protuberance disposed on the front wall is smaller than the protuberance disposed on the back wall.

7. The waste heat boiler of claim 6, wherein the protuberance disposed on the front wall is generally the same shape as the protuberance on the back wall.

8. The waste heat boiler of claim 7, including nozzles disposed in the side walls adjacent the narrowest portion of the necked down portion.

9. The waste heat boiler of claim 8, wherein the nozzles in the side walls are directed inward and downward.

10. The waste heat boiler of claim 8, wherein the nozzles in the side walls are directed downwardly at an angle generally in the range of 15° to 30°.

11. The waste heat boiler of claim 8, wherein the protuberance on the front wall extends into the flue a distance $L_2$, the pro-tuberance on the back wall extends into the furnace a distance $L_1$, and the ratio of $L_1/L_2$ is generally in the range of 2.

12. The waste heat boiler of claim 8, wherein the lower portion of each of the protuberances is disposed generally one diameter of the combustor or more above a central axis of the combustor measured from where the axis of the combustor intersects the flue.

13. The waste heat boiler of claim 1, wherein the lower portion of the protuberance is disposed generally one diameter of the combustor or more above a central axis of the combustor measured from where the axis of the combustor intersects the flue.

14. The waste heat boiler of claim 1, wherein the tip of the protuberance and the lower portion adjoining the tip are covered with an erosion, corrosion resistant material.

* * * * *